United States Patent
Simmler-Bornhauser et al.

(10) Patent No.: US 9,150,708 B2
(45) Date of Patent: Oct. 6, 2015

(54) ADHESIVE WITH BUFFER SYSTEM

(75) Inventors: Emil Simmler-Bornhauser, Buchberg (CH); Thomas Simmler-Caduff, Hüntwangen (CH)

(73) Assignee: ALFA KLEBSTOFFE AG, Rafz (CH)

( * ) Notice: Subject to any disclaimer, the term of this patent is extended or adjusted under 35 U.S.C. 154(b) by 0 days.

(21) Appl. No.: 13/809,120

(22) PCT Filed: Jul. 8, 2011

(86) PCT No.: PCT/CH2011/000161
§ 371 (c)(1),
(2), (4) Date: Jan. 25, 2013

(87) PCT Pub. No.: WO2012/003596
PCT Pub. Date: Jan. 12, 2012

(65) Prior Publication Data
US 2013/0123400 A1   May 16, 2013

(30) Foreign Application Priority Data

Jul. 9, 2010 (EP) .................................... 10405132

(51) Int. Cl.
| | | |
|---|---|---|
| *C09J 111/00* | (2006.01) | |
| *C09J 111/02* | (2006.01) | |
| *C08L 11/00* | (2006.01) | |
| *C08L 11/02* | (2006.01) | |
| *C08K 5/092* | (2006.01) | |
| *C08K 5/053* | (2006.01) | |
| *C08K 5/1535* | (2006.01) | |
| *C08L 33/06* | (2006.01) | |

(52) U.S. Cl.
CPC ............... *C08K 5/1535* (2013.01); *C08K 5/053* (2013.01); *C08K 5/092* (2013.01); *C09J 111/00* (2013.01); *C09J 111/02* (2013.01); *C08L 33/06* (2013.01)

(58) Field of Classification Search
CPC ...... C08K 5/053; C08K 5/092; C08K 5/1535; C09J 111/02; C09J 111/00; C08L 11/02; C08L 2666/04; C08L 33/06

USPC ........... 156/313; 521/150; 524/507, 552, 707, 524/111, 321, 388
See application file for complete search history.

(56) References Cited

U.S. PATENT DOCUMENTS

| | | | | |
|---|---|---|---|---|
| 5,322,886 | A | * | 6/1994 | Sauterey ....................... 524/707 |
| 6,086,997 | A | * | 7/2000 | Patel et al. .............. 428/355 BL |
| 6,319,352 | B1 | | 11/2001 | Simmler et al. |
| 2009/0126316 | A1 | * | 5/2009 | Ilekti et al. ................... 53/111 R |
| 2011/0237696 | A1 | * | 9/2011 | Achten et al. ................. 521/150 |
| 2012/0160410 | A1 | * | 6/2012 | Lorenz et al. .............. 156/307.3 |

FOREIGN PATENT DOCUMENTS

| | | |
|---|---|---|
| DE | 101 19 218 A1 | 11/2001 |
| DE | 10 2008 045 805 A1 | 3/2010 |
| EP | 0 624 634 A1 | 11/1994 |
| EP | 1 099 740 A1 | 5/2001 |
| EP | 2 166 054 A1 | 3/2010 |
| EP | WO2010/025862 * | 3/2010 |
| JP | 2004043666 A * | 2/2004 |
| JP | 2010/77176 * | 4/2010 |
| WO | WO 98/55559 A1 | 12/1998 |
| WO | WO 03/055471 A1 | 7/2003 |

OTHER PUBLICATIONS

Machine translation of JP 2004-043666 (Feb. 2004, 6 pages).*
Elisabeth Schwab, "Glycerol", Römpp Online, Version 3.16, ID=RD-07-01466, May 2004, XP-002659117, Retrieved from the Internet: URL:http://www.roempp.com [retrieved on Sep. 14, 2011], pp. 1-3.

* cited by examiner

*Primary Examiner* — Brieann R Fink
(74) *Attorney, Agent, or Firm* — Birch, Stewart, Kolasch & Birch, LLP

(57) ABSTRACT

An adhesive based on a polychloroprene dispersion is characterized in that a buffer system comprising at least one acid compound and glycerin is included in order to activate and stabilize the adhesive. A freeze-thaw stability of the adhesive is achieved by surprisingly high proportions of glycerin; however, a good initial adhesion is simultaneously ensured. The glycerin proportions range from 8-50 wt. %, preferably 14-40 wt. %, particularly preferably 22-30 wt. %. An organic acid is preferably used as the acid compound.

16 Claims, No Drawings

ADHESIVE WITH BUFFER SYSTEM

TECHNICAL FIELD

The invention relates to an adhesive based on a polychloroprene dispersion and to the use of a buffer system for the activation and stabilization of an adhesive based on a polychloroprene dispersion.

STATE OF THE ART

Use is currently made, in the industry of the processing of expanded plastics, of dispersion adhesives, in particular water-based and solvent-free adhesives based on polychloroprene (CR). Such adhesives can in particular adhesively bond together different grades of expanded plastic for the purpose of the preparation of mattresses, upholstered furniture, office chairs, car seats, and the like. In addition, these adhesives are, however, also suitable for the preparation of other industrial products, such as, e.g., insulation materials.

Typically, polychloroprene dispersions are specifically destabilized or activated in order to achieve a satisfactory initial adhesion. This is also described as "breaking". Acids have hitherto been used for this, which acids bring about a lowering of the pH of the adhesive formulation.

In EP 0 624 634 (ALFA Klebstoffe AG), boric acid is proposed for lowering the pH.

Boric acid is likewise mentioned in U.S. Pat. No. 6,319,352 B1 (Alfa Klebstoffe AG). With high amounts of boric acid, glycerol is used as "solvent" for the boric acid. EP 2 166 054 A1 (Wakol GmbH) describes in relation to this amino acids, such as, e.g., glycine, asparagine or glycylglycine, and also glyoxal, which are used dissolved in water.

A mixture of boric acid and amino acid, e.g. glycine, is described in U.S. Pat. No. 6,086,997 (Patel Vijay).

Furthermore, the addition of gaseous $CO_2$ as compound or medium having an acidifying effect for lowering the pH is known from DE 10 2008 045 805 A1.

However, all these formulas have it in common that they do not give a long-lasting lowering of the pH and accordingly quite a lot of problems occur in practice. That is, the formulated adhesives no longer satisfactorily adhere after a certain time or the formulation is not given stability, so that it thins out or coagulates form in the whole mixture, which make the adhesive unusable. With known formulas, the shear stability in particular, and also the storage and transportation stability, unsatisfactorily encounters limits. This difficulty is in addition aggravated in cold seasons at temperatures of less than 0° C., resulting in increased requirements, e.g. shipments protected from cold, having to be met on transporting and storing such products.

In relation to this, it is admittedly possible to carry out the destabilization or activation of the adhesive formulations according to the two-component principle only shortly before use. However, this represents an additional expense for the user, which should if possible be avoided.

There accordingly continues to be a need for alternative adhesive formulations which as much as possible do not exhibit the abovementioned disadvantages.

DESCRIPTION OF THE INVENTION

The object of the invention is accordingly to make available an adhesive which, immediately after application, exhibits the highest possible initial adhesion and at the same time exhibits the greatest possible long-term stability.

The object is achieved by the characteristics defined in claim 1. According to the invention, the adhesive, which is based on a polychloroprene dispersion, comprises a buffer system, including at least one acid compound and glycerol, for the activation and stabilization of the adhesive, in which glycerol exhibits, based on the total weight of the adhesive dispersion, a proportion of 8-50% by weight, preferably 14-40% by weight, particularly preferably 22-30% by weight.

The polychloroprene dispersion is a polymer dispersion. The expression "polymer dispersion" is understood to mean in particular a heterogeneous mixture of at least one polymer compound and one liquid. In this connection, the polymer compound, as disperse phase, is dispersed in the finest possible way in the liquid, as dispersion medium. In other words, the polymer dispersion forms a suspension which comprises the polymer compound in colloid form. The polymer dispersion is advantageously an aqueous polymer dispersion which in particular, except for inevitable impurities, is free from organic solvents.

By the combination with the buffer system according to the invention, adhesives based on polychloroprene are available which, in comparison with known formulations, exhibit a far higher stability and simultaneously have an excellent initial adhesion.

A buffer system describes, in the present context, a mixture of at least two components, including at least one acid compound and glycerol, which interact synergistically with the other components of the adhesive so that the adhesive, in comparison with the polychloroprene dispersion, exhibits an enhanced initial adhesion with at the same time improved stability. Correspondingly, the proportion of the buffer system or the proportions of the at least one acid compound and of the glycerol are in particular chosen so that an enhanced initial adhesion with at the same time improved stability is achieved. In this connection, the acid compound preferably exhibits a proportion of at least 0.01% by weight. A maximum proportion of acid compound is in particular 10% by weight. The proportion of the acid compound is influenced, inter alia, by the acid strength or the $pK_A$ of the acid compound. The proportion of glycerol is advantageously at least 8% by weight. An advantageous maximum value of the proportion of glycerol is 50% by weight.

An acid compound is understood to mean, in this context, a chemical compound which operates in particular within the meaning of a Brønstedt acid as proton donor and/or in the form of a Lewis acid as electrophilic electron acceptor. Likewise, the acid compound can also, however, be a substance which displays an acid effect through an interaction with the other components of the adhesive. The acid compound can, for example, be an organic chemical, inorganic chemical and/or organometallic compound. In principle, the acid compound can exist or be added in solid, liquid and/or gaseous form.

If not otherwise indicated, all specifications relating to percentage by weight or % by weight of individual components of the adhesives according to the invention refer to the wet total weight of the adhesive which can be used or which is ready for use.

The adhesives according to the invention based on a polychloroprene dispersion and a buffer system, including at least one acid compound and glycerol, show, inter alia, surprisingly high initial adhesion values and have proven to be to a large degree stable in the long term and under the most varied external conditions. In particular, it is possible, with the adhesives according to the invention, to produce higher storage, transportation and processing stabilities. Correspondingly, the adhesives according to the invention also have longer storage lives, which means an additional flexibility in the processing of the adhesives.

This is surprising inasmuch as it was hitherto assumed that glycerol in principle more likely interferes with the initial adhesion in adhesives. In comparison with adhesives comprising either only an acid compound or only glycerol, the adhesives according to the invention show, however, in particular an unexpectedly high stability with unchanged or improved initial adhesion.

With regard to stability, it has been shown that the adhesive properties which are crucial in practice, such as, e.g., the initial adhesion, the chemical composition, the viscosity or the optical appearance, remain essentially unchanged for up to several months. This then also makes it possible to use the adhesives according to the invention as one-component systems, which substantially simplifies the handling for the user.

In particular, the adhesives according to the invention show a significant freeze-thaw stability. This means that the adhesive can be frozen and can be again thawed out to the greatest possible extent free of residues, and at the same time retains its properties. The minimum temperature to which a dispersion adhesive according to the invention can be cooled depends on the proportion of glycerol.

In the context of the invention, glycerol exhibits, based on the total weight of the wet adhesive, a proportion of 8-50% by weight, preferably 14-40% by weight and particularly preferably 22-30% by weight. As has been shown, the adhesives according to the invention exhibit freeze-thaw stability, in fact without this at the same time having noticeably interfered with their initial adhesion. This is particularly unexpected since it was hitherto assumed that such unusually high proportions of glycerol result in a massive reduction in the initial adhesion. In the context of the present invention, exactly the opposite was observed, however, which might be put down to the buffer system or the interaction of the acid compound and the glycerol.

On freezing adhesives with the abovementioned proportions of glycerol, these can be thawed out again free from residues, this being the case moreover without the advantageous properties of the adhesives suffering under that. On the contrary, the adhesives have, immediately after thawing, the necessary initial adhesion and can be used in accordance with the requirements. In other words, the adhesives according to the invention can be reversibly frozen and again thawed out.

This property is in particular of great advantage with regard to the storage and the transportation of the adhesive. In adhesives known hitherto, which normally cannot be frozen and thawed out without loss of quality, the transportation in particular in cold seasons requires special measures, that is lavish and accordingly expensive thermal shipments. This difficulty is completely inapplicable with the adhesives according to the invention, by which these can inter alia be sold more economically.

Glycerol proportions of 8-50% by weight, based on the total weight of the adhesive dispersion, have a positive effect on the freeze-thaw stability. Higher proportions of glycerol than 50% by weight are admittedly likewise possible but do not result in any additional usefulness with regard to freeze-thaw stability. With lower proportions of glycerol than 8% by weight, the freeze-thaw stability strongly decreases. However, in this case, the improved stability in the temperature range above the freezing point is retained. It is generally the case that, with a decreasing proportion of glycerol, the temperature at which a freeze-thaw stability is still present increases and generally migrates toward 0° C. The less glycerol present in the adhesive, the less the resistance to freezing offered by this adhesive.

Preferably, the proportion of the glycerol is 14-40% by weight. Particularly preferably, the adhesive consists of 22-30% by weight of glycerol. With these proportions of glycerol, the adhesive can be cooled down to less than −20° C. several times and can subsequently be again thawed out, without its adhesive properties changing. In this particularly preferred range, the initial adhesion is good.

In a preferred embodiment, the adhesives according to the invention accordingly exist as one-component adhesives. For special applications, it is, however, in principle possible to also design the adhesives as multicomponent systems.

In comparison with adhesives without the buffer system according to the invention, the adhesives according to the invention moreover have improved processabilities and machine run properties. Likewise, the adhesives according to the invention show a faster drying or hardening.

In comparison with known adhesives, which, for example, comprise simply an acid for the activation, the necessary amount of acid compound can be reduced on the basis of the buffer system according to the invention with moreover the same high initial adhesion, which has a positive effect on the manufacturing costs. Moreover, this clearly shows the synergistic interaction between acid compound and glycerol in the adhesives according to the invention.

The buffer system according to the invention moreover operates with a broad pallet of the most varied acid compounds and can accordingly be flexibly used. It is thus, e.g., of secondary importance in which form the at least one acid compound is present. Even with polychloroprene dispersion, which are supplied with gaseous $CO_2$ as acid compound, a significant improvement in stability with a high initial adhesion can be achieved by the addition of glycerol or the preparation of a buffer system according to the invention.

The adhesives according to the invention can in addition be processed flexibly and simply. Thus, the adhesives can, without additional pretreatment, be applied directly by means of spray nozzles, low-pressure spray guns, brushes, rolling units or the like to a substrate to be adhesively bonded. A prior mixing of additional components is accordingly not necessary.

In cooperation with an acid compound, glycerol accordingly has proven to be an advantageous buffer system in adhesives based on polychloroprene dispersions.

Preferably, the polychloroprene dispersion additionally comprises polyacrylates, in particular acrylic ester copolymers, styrene/acrylate copolymers and/or mixtures thereof. The polyacrylates are in this connection in particular advantageous in combination with polychloroprene as polymeric main component and act as additional binder. The additional polyacrylates exhibit in particular a lower proportion than the polymeric main component. It is possible, through the additional polyacrylates and in particular the representatives mentioned, to significantly increase both the starting adhesion value and the final adhesion value of the adhesives according to the invention and to adapt them to different substrates to be adhesively bonded.

However, it is also possible, in place of or in addition to polyacrylates, to add other compounds in order to improve the adhesive properties.

It can likewise be advantageous if the polychloroprene dispersion additionally comprises one or more polymer compounds from the series polyvinyl acetate, polyvinyl butyral and/or polyurethane. Additional polymer compounds can also advantageously be in the form of copolymers of vinyl acetate, ethylene vinyl acetate, vinyl butyral and/or urethane. Terpolymers may also be involved in particular in this connection.

The additional polymer compounds mentioned are in particular advantageous in combination with polychloroprene as polymeric main component and optionally additional polyacrylates. The presence of the additional polymer compounds improves in particular the adhesive properties and also the resistance of the adhesives and makes possible a reduction in the manufacturing costs.

However, an addition of additional polymer compounds is not essential and may even be dispensed with, depending on the use for which the adhesive is intended.

In a preferred embodiment, the at least one acid compound exhibits a $pK_A$ of 2-10. $pK_A$ is understood to mean the negative common logarithm of the equilibrium constants $K_A$ of the acid compound in water at a temperature of 25° C. As has already been shown, such acid compounds in combination with glycerol produce particularly effective buffer systems for a multitude of advantageous polychloroprene dispersions. As a result, both the initial adhesion and the stability of the adhesives according to the invention are generally significantly improved. Furthermore, acid compounds with a $pK_A$ of 2-10 can be satisfactorily metered out in adhesive manufacture.

In principle, however, even acid compounds with a $pK_A$ of less than 2 or more than 10 can be used. This may possibly even be advantageous for special adhesives and/or special applications.

It is also optionally possible, together with an at least one acid compound with a $pK_A$ of 2-10, to provide for one or more additional acid compounds which do not necessarily have to exhibit a $pK_A$ in the range of 2-10.

The at least one acid compound particularly preferably includes a proton donor. The at least one acid compound includes in particular citric acid ($pK_{A1}$=3.13, $pK_{A2}$=4.76, $pK_{A3}$=6.4), tartaric acid ($pK_{A1}$=2.98, $pK_{A2}$=4.34), ascorbic acid ($pK_A$=4.25), maleic acid or its anhydride ($pK_{A1}$=1.9, $pK_{A2}$=6.5), malic acid ($pK_{A1}$=3.46, $pK_{A2}$=5.10), amino acids, such as, e.g., glycine ($pK_{COOH}$=2.35, $pK_{NH_2}$=9.78), monosodium dihydrogenphosphate ($pK_{A1}$=7.2, $pK_{A2}$=12.32) and/or carbonic acid ($pK_{A1}$=6.35, $pK_{A2}$=10.33).

In this connection, it is also possible for two or more representatives of the acid compounds mentioned to be used in combination. On using such compounds in combination with glycerol, the advantages according to the invention, that is a high initial adhesion with at the same time improved stability, become especially obvious. Moreover, it has been shown that the acid compounds mentioned are to a wide extent compatible with a multitude of additional adhesive components.

However, in principle, other acid compounds can be provided for, instead of or in addition to the abovementioned representatives. These can be, e.g., Lewis acids and/or CH-acid organic compounds.

Advantageously, the at least one acid compound has, based on the total weight of the adhesive dispersion, a proportion of 0.01-10% by weight, in particular 0.1-1.5% by weight. Such proportions produce, in combination with glycerol, an optimal effect of the buffer system in the adhesive. This is the case in particular in connection with a proportion of glycerol of 8-50% by weight, preferably 14-40% by weight and particularly preferably 22-30% by weight. In this case, adhesives with unexpectedly high initial adhesion values and freeze-thaw stabilities can be produced.

The at least one acid compound can, however, in principle also exhibit lower proportions than 0.01% by weight or higher proportions than 10% by weight. However, in this case, the advantages according to the invention generally decrease.

An advantageous ratio by weight of glycerol to the at least one acid compound lies in the range of 0.8-500, in particular 5-300 and more preferably 10-100. An optimally functioning buffer system is thereby obtained. However, it is in principle also possible to prepare adhesives according to the invention with other ratios by weight.

A pH of the adhesive advantageously lies in the range of 5-9, particularly preferably in the range of 7-9. Such a pH is in particular optimum in order to achieve a high initial adhesion with simultaneous stability.

However, it is in principle possible to provide for adhesives with lower or higher pH values.

According to additional preferred embodiments, the adhesives according to the invention optionally comprise at least one emulsifier, in which the at least one emulsifier comprises in particular a polyglycol ether, sodium lauryl sulfate and/or methyl vinyl ether/maleic anhydride copolymer. The stability of the adhesives can be further increased and at the same time the processability can be improved through such emulsifiers.

In principle, such emulsifiers can also be left out or can be replaced by other emulsifiers.

More preferably, the adhesive according to the invention comprises an optional plasticizer, in particular one or more representatives from the series tributyl acetylcitrate, benzoates and/or dialkyl terephthalates. As has been shown, the plasticizers mentioned are in particular compatible with the buffer system according to the invention, without the stability or initial adhesion being interfered with. The plasticizer advantageously has a proportion of 0.1-20% by weight, in particular 0.1-10% by weight, preferably 0.5-5% by weight and more preferably 1-2% by weight. An adhesive film applied to a substrate becomes more flexible as a result of the plasticizers, resulting, for example, in plastic adhesion being enhanced.

However, plasticizers are not in principle absolutely necessary. Accordingly, it is also possible to do without them.

In addition, it can be advantageous to add fillers to the adhesive. Preference is given in this connection to $CaCO_3$, ZnO, MgO, $TiO_2$, $ZrO_2$ and/or talc. In this way, the manufacturing costs, inter alia, can be reduced. However, such fillers are optional and can if appropriate also be left out or replaced by other fillers.

In addition, the adhesives according to the invention can optionally have one or more extra components from the series thickeners, colorants, wetting agents, resins, UV absorbers, antifoaming agents and/or biocides. The adhesives may thereby be adapted to specific requirements or environmental factors.

Particularly suitable thickeners are, e.g., aqueous dispersions of methyl vinyl ether/maleic anhydride copolymers.

Additional advantageous embodiments and combinations of features of the invention ensue from the following detailed description and the totality of the claims.

Routes for the Implementation of the Invention

1. Polychloroprene-Based Adhesive

A first adhesive composition according to the invention is listed in table 1. All proportions by weight are based on the wet total weight of the ready-for-use adhesive. Dispercoll C84 (Bayer Material Science), an aqueous colloidal dispersion of a polymer of 2-chloro-butadiene, is used as polychloroprene dispersion. The dispersion comprises approximately 55% by weight of proportion of polymer in $H_2O$. The buffer system consists of glycerol (proportion by weight 23.56% by weight; 1st buffer component) and ascorbic acid (0.75% by weight; $pK_A$=4.25; 2nd buffer component) as acid compound.

The ratio by weight of glycerol to ascorbic acid is approximately 31. The pH of the adhesive is approximately 8.0.

On the one hand, methyl vinyl ether/maleic anhydride copolymers (MVE/MA copolymers; 0.5% solutions in $H_2O$) are available as emulsifiers. On the other hand, a 30% solution of sodium lauryl sulfate in $H_2O$ is used. In addition, a sodium salt of a sulfated fatty alcohol ethoxylate is used.

In addition, the first adhesive according to the invention comprises Agitan 305 as antifoaming agent and 0.31% by weight of water for diluting.

The adhesive composition of table 1 is prepared by mixing the mentioned components with one another in a way known per se.

TABLE 1

| Component | Proportion by weight in % | Function |
|---|---|---|
| Polychloroprene dispersion (CR; e.g. Dispercoll C84; 55% proportion of polymer in $H_2O$) | 60.47 | Polymer base; binder |
| Glycerol | 23.56 | 1st buffer component |
| Ascorbic acid | 0.75 | 2nd buffer component |
| MVE/MA copolymer (0.5% in $H_2O$) | 10.99 | Emulsifier |
| Sodium lauryl sulfate (30% in $H_2O$) | 1.31 | Stabilizer |
| Agitan 305 | 0.04 | Antifoaming agent |
| Water | 1.31 | Diluent |
| Sodium salt of a sulfated fatty alcohol ethoxylate | 1.57 | Emulsifier |

Tests with the first adhesive dispersion according to the invention have given a storage stability at ambient temperature in the range of 6-8 months. Moreover, the adhesive dispersion is to a large extent stable with regard to frost. The dispersion admittedly freezes at temperatures below 0° C. or solidifies but can be thawed out several times while free from residues and can then be used again in accordance with the requirements.

Furthermore, the first adhesive dispersion according to the invention has a high initial adhesion or instantaneous adhesion after the application of adhesive. Expanded plastic substrates in particular can thereby be directly processed after assembling, without the danger existing of the assembled parts slipping. In expanded plastic adhesion, the initial adhesion on using the first adhesive according to the invention is generally so high that, with appropriate strain, the assembled expanded plastic substrates are destroyed before the adhesive layer.

2. Polychloroprene-Based Adhesive

Table 2 again gives the composition of a second adhesive according to the invention. All proportions by weight again refer to the wet total weight of the ready-for-use adhesive. Dispercoll C84 (Bayer Material Science) is also here used as polychloroprene dispersion. The buffer system consists of glycerol (proportion by weight 29.30% by weight; 1st buffer component) and citric acid (0.27% by weight; $pK_{A1}$=3.13, $pK_{A2}$=4.76, $pK_{A3}$=6.4; 2nd buffer component) as acid compound. The ratio by weight of glycerol to citric acid is approximately 109. The pH of the adhesive is approximately 8.1.

Methyl vinyl ether/maleic anhydride copolymers (MVE/MA copolymers; 0.5% solutions in $H_2O$), sodium lauryl sulfate (30% solution in $H_2O$) and tributyl acetylcitrate are used as emulsifiers.

Mowidick EMS 6, as thickener, 0.10% by weight of water, for diluting, and Dispercoll S 5005, an aqueous anionic colloidal solution of amorphous silicon oxide, are used to adjust to the correct viscosity.

The adhesive with the composition according to Table 2 is prepared from the listed components by mixing in a way known per se.

TABLE 2

| Component | Proportion by weight in % | Function |
|---|---|---|
| Polychloroprene dispersion (CR; e.g. Dispercoll C84; 55% proportion of polymer in $H_2O$) | 53.92 | Polymer base; binder |
| Glycerol | 29.30 | 1st buffer component |
| Citric acid | 0.27 | 2nd buffer component |
| MVE/MA copolymer (0.5% in $H_2O$) | 11.23 | Emulsifier |
| Sodium lauryl sulfate (30% in $H_2O$) | 2.10 | Stabilizer |
| Mowidick EMS 6 | 0.39 | Thickener |
| Tributyl acetylcitrate | 1.76 | Emulsifier |
| Dispercoll S 5005 | 0.94 | Viscosity adjuster |
| Water | 0.10 | Diluent |

The properties of the second adhesive dispersion according to the invention with regard to the storage stability at ambient temperature and also the freeze-thaw stability are comparable to those of the first adhesive dispersion according to the invention. Moreover, the second adhesive dispersion according to the invention also has a high initial adhesion or instantaneous adhesion after the application of the adhesive.

3. Polychloroprene-Based Adhesive

A third adhesive composition according to the invention is listed in table 3. Dispercoll C84 (Bayer Material Science), with approximately 55% by weight of proportion of polymer in $H_2O$, is used as polychloroprene dispersion. The buffer system consists of glycerol (proportion by weight of 29.5% by weight; 1st buffer component) and citric acid (0.3% by weight; $pK_{A1}$=3.13, $pK_{A2}$=4.76, $pK_{A3}$=6.4; 2nd buffer component) as acid compound. The ratio by weight of glycerol to citric acid is approximately 98. The pH of the adhesive is approximately 8.

The adhesive additionally comprises thickeners for adjusting the viscosity. An aqueous anionic colloidal solution of amorphous silicon oxide (e.g., Dispercoll S 3030; Bayer Material Science) in combination with aqueous dispersions of methyl vinyl ether/maleic anhydride copolymers (e.g., Mowilith EMS 6; Celanese Emulsions; approximately 6% proportion of solids) is, e.g., provided for this.

On the one hand, methyl vinyl ether/maleic anhydride copolymers (MVE/MA copolymers; 0.5% solutions in $H_2O$) are available as emulsifiers. On the other hand, a 30% solution of sodium lauryl sulfate in $H_2O$ is used.

Furthermore, the third adhesive according to the invention comprises tributyl acetylcitrate as plasticizer and a biocide based on chloromethyl/methyl-isothiazolone and bronopol. The latter is available, for example, under the name Rocima 520 from Rohm and Haas.

TABLE 3

| Component | Proportion by weight in % | Function |
| --- | --- | --- |
| Polychloroprene dispersion (CR; e.g. Dispercoll C84; 55% proportion of polymer in $H_2O$) | 53.1 | Polymer base; binder |
| Glycerol | 29.5 | 1st buffer component |
| Citric acid (powder) | 0.3 | 2nd buffer component |
| Colloidal silicon oxide solution (e.g., Dispercoll S 3030; approximately 30% proportion of solids in $H_2O$) | 2.0 | Thickener |
| Mowilith EMS 6 | 0.3 | Thickener |
| Sodium lauryl sulfate (30% in $H_2O$) | 1.9 | Emulsifier, stabilizer |
| MVE/MA copolymer (0.5% in $H_2O$) | 11.2 | Emulsifier |
| Tributyl acetylcitrate | 2.0 | Plasticizer |
| Biocide based on chloromethyl/methylisothiazolone and bronopol (e.g., Rocima 520) | 0.1 | Preservative |

The third adhesive dispersion according to the invention also exhibits all of the advantageous properties mentioned.

4. Polychloroprene-Based Adhesive

An example of an adhesive with a somewhat lower proportion of glycerol is given in table 4. The freeze-thaw stability of this adhesive is, in comparison with the first three examples, somewhat diminished. The adhesive can safely be used at minus temperatures down to approximately −10° C.

TABLE 4

| Component | Proportion by weight in % | Function |
| --- | --- | --- |
| Polychloroprene dispersion (CR; e.g. Dispercoll C84; 55% proportion of polymer in $H_2O$) | 49.63 | Polymer base; binder |
| Glycerol | 16.54 | 1st buffer component |
| Citric acid | 0.3 | 2nd buffer component |
| Dispercoll S 5005 | 0.35 | Viscosity adjuster |
| Sodium lauryl sulfate (30% in $H_2O$) | 0.96 | Stabilizer |
| MVE/MA copolymer (0.5% in $H_2O$) | 9.58 | Emulsifier |
| Tributyl acetylcitrate | 0.35 | Plasticizer |
| Sodium salt of a sulfated fatty alcohol ethoxylate | 0.52 | Emulsifier |
| Water | 21.77 | Diluent |

5. Polychloroprene-Based Adhesive

An example of a polychloroprene-based adhesive with an increased proportion of glycerol of approximately 37% by weight is found in table 5. This adhesive exhibits a particularly good freeze-thaw stability (below −20° C.), even if it dries more slowly in comparison with examples 1-3.

TABLE 5

| Component | Proportion by weight in % | Function |
| --- | --- | --- |
| Polychloroprene dispersion (CR; e.g. Dispercoll C84; 55% proportion of polymer in $H_2O$) | 44.63 | Polymer base; binder |
| Glycerol | 36.98 | 1st buffer component |
| Citric acid | 0.29 | 2nd buffer component |
| Dispercoll S 5005 | 2.17 | Viscosity adjuster |
| Sodium lauryl sulfate (30% in $H_2O$) | 7.01 | Stabilizer |
| MVE/MA copolymer (0.5% in $H_2O$) | 7.01 | Emulsifier |
| Tributyl acetylcitrate | 1.91 | Plasticizer |

6. Adhesive Based on Polychloroprene and Acrylate

Table 6 again gives a sixth adhesive composition according to the invention. All proportions by weight relate though to the wet total weight of the ready-for-use adhesive. As in the other adhesives according to the invention, Dispercoll C84 (Bayer Material Science) is used as polychloroprene dispersion. In addition, an acrylate dispersion is present. The latter is, e.g., Acronal S 600 from BASF, which exhibits approximately 50% acrylate in $H_2O$. The buffer system consists of a glycerol solution (8.50% by weight; 1st buffer component) and citric acid (0.37% by weight; $pK_{A1}$=3.13, $pK_{A2}$=4.76, $pK_{A3}$=6.4; 2nd buffer component) as acid compound. The ratio by weight of glycerol to citric acid is approximately 23.

Furthermore, the sixth adhesive according to the invention comprises the stabilizer sodium lauryl sulfate (30% in $H_2O$), MVE/MA copolymers (0.5% in $H_2O$) and tributyl acetylcitrate as emulsifiers and Dispercoll S 5005 for adjusting the viscosity. The pH of the adhesive is approximately 8.4.

TABLE 6

| Component | Proportion by weight in % | Function |
| --- | --- | --- |
| Polychloroprene dispersion CR (e.g., Dispercoll C84; approximately 55% proportion of polymer in $H_2O$) | 78.13 | Polymeric main component; binder |
| Acrylate dispersion (e.g., Acronal S 600; approximately 50% proportion of polymer in $H_2O$) | 5.09 | Acrylic ester binder |
| Glycerol (86.5% in $H_2O$) | 8.5 | 1st buffer component |
| Citric acid (powder) | 0.37 | 2nd buffer component |
| Sodium lauryl sulfate (30% in $H_2O$) | 0.59 | Stabilizer |
| MVE/MA copolymer (0.5% in $H_2O$) | 0.85 | Emulsifier |
| Dispercoll S 5005 | 0.51 | Viscosity adjuster |
| Tributyl acetylcitrate | 4.76 | Emulsifier |

The sixth adhesive according to the invention exhibits a limited frost stability at temperatures down to −5° C. Tests on storage stability at ambient temperature and also on the initial adhesion have given essentially the same results as with the polychloroprene-based adhesive dispersions.

7. Adhesive Based on Polychloroprene and Acrylate

Table 7 again gives a seventh adhesive composition according to the invention, the base of which is formed from polychloroprene and acrylate. The buffer system consists of a glycerol solution (86.5% of glycerol in $H_2O$; 1st buffer component) and citric acid (2.3% by weight; $pK_A$=9.14; 2nd buffer component) as acid compound. The proportion by weight of pure glycerol in the adhesive is correspondingly approximately 16.7% by weight. The ratio by weight of glycerol to citric acid is approximately 7. Furthermore, the seventh adhesive according to the invention comprises tributyl acetyl-citrate as plasticizer and Mowilith EMS 6 as thickener. The pH of the adhesive is approximately 7.5.

TABLE 7

| Component | Proportion by weight in % | Function |
|---|---|---|
| Polychloroprene dispersion CR (e.g., Dispercoll C84; approximately 55% proportion of polymer in $H_2O$) | 58.4 | Polymeric main component; binder |
| Acrylate dispersion (e.g., Acronal S 600; approximately 50% proportion of polymer in $H_2O$) | 20.9 | Additional binder |
| Glycerol (86.5% in $H_2O$) | 16.7 | 1st buffer component |
| Citric acid | 2.3 | 2nd buffer component |
| Mowilith EMS 6 | 2.1 | Thickener |
| Tributyl acetylcitrate | 1.7 | Plasticizer |

Tests with the seventh adhesive dispersion according to the invention have given essentially the same results as with the first three adhesive dispersions. Due to the high proportion of glycerol, the freeze-thaw stability of the adhesive is guaranteed even at temperatures down to −20° C.

Comparative Tests

Several additional tests were carried out for comparative purposes. In a first series of comparative tests, glycerol was left out as buffer component in the formulas of the adhesive dispersions according to the invention. In this connection, the storage stabilities significantly worsened. Glycerol-free adhesive dispersions already tend to coagulate after a few days or weeks and become unusable. Furthermore, the adhesive dispersions without glycerol are not stable with regard to frost. On thawing out, residues were without exception observed, which residues at least greatly reduce the quality of the adhesive dispersions. Furthermore, the formulas without glycerol show a reduced initial adhesion.

In a second series of comparative tests, the proportion of glycerol in the polychloroprene dispersions according to the invention was varied and the influence of the proportion of glycerol on the adhesive properties at −20° C. was investigated. The properties of a polychloroprene-based adhesive with glycerol proportions of between 5 and 40% by weight are summarized in table 8. The buffer system consists, in addition to the glycerol, of citric acid, which is present at a total of 0.378% by weight.

The initial adhesion is evaluated on a subjective scale of 1-10, in which no initial adhesion is evaluated at 1. A usable adhesive normally exhibits values in the range 4-6 (satisfactory-very good).

TABLE 8

| % by weight of glycerol | Initial adhesion | Freeze-thaw stability at −20° C. |
|---|---|---|
| 5 | 6, able to be corrected | No |
| 10 | 6, able to be corrected | No |
| 15 | 5.5 | No |
| 20 | 5, bites better the 2nd time | No |
| 25 | 5 | Yes |
| 30 | 4-5 | Yes |
| 35 | 3 | Yes |
| 40 | 2 | Yes |

Table 9 likewise shows the properties of a polychloroprene-based adhesive. However, in addition, an acrylate dispersion is present. The adhesive properties of the dispersion adhesive with glycerol proportions of between 5 and 40% by weight are summarized. In addition to glycerol, the buffer system also comprises citric acid, which is present at a proportion of 0.378% by weight.

TABLE 9

| % by weight of glycerol | Initial adhesion | Freeze-thaw stability at −20° C. |
|---|---|---|
| 5 | 6, takes off as regards adhesive | No |
| 10 | 6, stringing | No |
| 15 | 5.5, not able to be corrected | No |
| 20 | 5 | No |
| 25 | 4.5 | Yes |
| 30 | 3.5-4 | Yes |
| 35 | 3 | Yes |
| 40 | 2 | Yes |

Both test series show that formulas with very small proportions of glycerol have no freeze-thaw stability at −20° C. Thus, e.g. with formulas with a proportion of glycerol of 5% by weight, residues are without exception detected on thawing out, which residues at least greatly reduce the quality of the adhesive dispersions. However, the initial adhesion remains at a high level.

Limited freeze-thaw stabilities are found with adhesive formulas with a proportion of glycerol of less than 22% by weight, above all in the range 14-22% by weight but also in the range of 8-14% by weight. This means that these adhesives can be used with slight frost, e.g. at −10° C. The initial adhesion is not impaired by these proportions of glycerol.

In a particularly preferred range of 22-30% by weight, glycerol exhibits a good freeze-thaw stability at −20° C. and simultaneously a good initial adhesion.

In practice, particular preference is given to proportions of glycerol of 12-40% by weight, in particular 14-30% by weight.

Adhesives with proportions of glycerol of greater than 30% by weight, above all in the range 30-40% by weight, likewise exhibit a good freeze-thaw stability. With these formulas, the initial adhesion is limited, though, and the hardening of the adhesive is accordingly slowed down. Such an adhesive has advantages at very low temperatures (below −20° C.), even if the adhesive process lasts longer.

An even more extreme freeze-thaw stability can be obtained through proportions of glycerol of 40-50% by weight. However, it is disadvantageous that such a formulated adhesive exhibits a poor initial adhesion and moreover dries very slowly. With even higher proportions of glycerol, the adhesive properties are no longer satisfactory.

In additional tests, the proportion of glycerol necessary for a set temperature was determined.

For an adhesive according to the first adhesive composition according to the invention, which is based on polychloroprene, a very good freeze-thaw stability at −15° C. can be obtained through proportions of glycerol of 20% by weight. In comparison, for freeze-thaw stability at lower temperatures (−20° C., −25° C. and −36° C.), proportions of more than 25% by weight are necessary. The adhesives are in this context very stable.

For an adhesive based on polychloroprene and acrylate, a freeze-thaw stability can be achieved at −15° C., likewise through a proportion of glycerol of 20% by weight. The thawing, though, cannot be carried out completely free from residues. This is only possible with a glycerol content of approximately 25% by weight. In comparison, for a freeze-thaw stability at lower temperatures (−20° C., −25° C. or −36° C.), proportions of more than 25% by weight are necessary. Coagulates are already formed at temperatures below −25° C.

The abovementioned exemplary embodiments or adhesive dispersions are to be understood simply as illustrative examples which in the context of the invention can be modified as desired.

For example, it is possible, with the first five adhesive dispersions, additionally to add acrylates and/or to dispense with emulsifiers, thickeners, biocides, plasticizers, antifoaming agents, stabilizers and/or substances for adjusting the viscosity or to replace these with other substances, such as, e.g., mentioned in the general descriptive part. It is likewise possible, in place of or additionally to the acids mentioned, to provide for another acid compound, e.g. citric acid, tartaric acid, ascorbic acid, maleic acid or its anhydride, malic acid, amino acids, such as, e.g., glycine, monosodium dihydrogenphosphate and/or carbonic acid. It is possible, with the adhesive dispersions 6 and 7 based on polychloroprene and acrylate according to the invention, to dispense, e.g., with the acrylates, stabilizers, emulsifiers, plasticizers, thickeners and/or substances for adjusting the viscosity. It is also possible to replace these components with other substances such as, e.g., mentioned in the general descriptive part. Moreover, it is also possible, in place of or in addition to the citric acid, to use another acid compound, e.g., tartaric acid, ascorbic acid, maleic acid or its anhydride, malic acid, amino acids, such as, e.g., glycine, monosodium dihydrogenphosphate and/or carbonic acid. It is also conceivable to add, for example, polyurethanes to the adhesive dispersions according to the invention.

Moreover, it is possible to add fillers, in particular $CaCO_3$, ZnO, MgO, $TiO_2$, $ZrO_2$ and/or talc, to all adhesive dispersions according to the invention. It is also possible to add extra components from the series colorants, wetting agents, resins, UV absorbers, antifoaming agents and/or biocides.

To summarize, it can be established that advantageous adhesives based on polymer dispersions were produced, which adhesives are characterized by a high initial adhesion and stability. The adhesives can, because of the high stability, be designed without problems as one-component adhesives and can in addition be adjusted so that a freeze-thaw stability is obtained. The latter makes it possible in particular to significantly reduce the transportation and storage costs.

The invention claimed is:

1. A one-component adhesive system comprising:
   a one-component adhesive consisting of a polychloroprene dispersion, and
   a buffer system, which comprises at least one acid compound and glycerol, wherein glycerol is present, based on the total weight of the adhesive, as a proportion of 14 to 30% by weight.

2. The one-component adhesive system of claim 1, in which the polychloroprene dispersion comprises polyacrylates.

3. The one-component adhesive system of claim 1, in which the polychloroprene dispersion comprises polymers and/or copolymers of vinyl acetate, ethylene vinyl acetate, vinyl butyral and/or urethane.

4. The one-component adhesive system of claim 1, in which the at least one acid compound exhibits a $pK_A$ of 2-10.

5. The one-component adhesive system of claim 1, in which the at least one acid compound is selected from the group consisting of: citric acid, tartaric acid, ascorbic acid, maleic acid, maleic anhydride, malic acid, amino acids, monosodium dihydrogenphosphate and carbonic acid.

6. The one-component adhesive system of claim 1, in which the at least one acid compound has, based on the total weight of the adhesive dispersion, a proportion of 0.01-10% by weight.

7. The one-component adhesive system of claim 1, in which a ratio by weight of glycerol to the at least one acid compound lies in the range of 0.8-500.

8. The one-component adhesive system of claim 1, in which a pH of the adhesive lies in the range of 5-9.

9. The one-component adhesive system of claim 1, further comprising at least one emulsifier, in which the at least one emulsifier is selected from the group consisting of: polyglycol ether, sodium lauryl sulfate and methyl vinyl ether/maleic anhydride copolymer.

10. The one-component adhesive system of claim 1, further comprising at least one plasticizer selected from the group consisting of: tributyl acetylcitrate, benzoates and dialkyl terephthalates.

11. The one-component adhesive system of claim 1, further comprising at least one filler selected from the group consisting of: $CaCO_3$, ZnO, MgO, $TiO_2$, $ZrO_2$ and talc.

12. The one-component adhesive system of claim 1, further comprising one or more non-adhesive components selected from the group consisting of: thickeners, colorants, wetting agents, resins, UV absorbers, antifoaming agents and biocides.

13. The one-component adhesive system of claim 2, in which the polychloroprene dispersion comprises polymers and/or copolymers of vinyl acetate, ethylene vinyl acetate, vinyl butyral and/or urethane.

14. The one-component adhesive system as claimed in claim 2, wherein the at least one acid compound exhibits a $pK_A$ of 2-10.

15. The one-component adhesive system as claimed in claim 2, wherein the polyacrylates are selected from the group consisting of: acrylic ester copolymers, styrene/acrylate copolymers and mixtures thereof.

16. A one-component adhesive system comprising:
   a one-component adhesive consisting of a polychloroprene dispersion, and
   a buffer system, which comprises at least one acid compound and glycerol, wherein glycerol is present, based on the total weight of the adhesive, as a proportion of 22-30% by weight.

* * * * *